US005864483A

United States Patent [19]

Brichta

[11] Patent Number: 5,864,483

[45] Date of Patent: *Jan. 26, 1999

[54] MONITORING OF SERVICE DELIVERY OR PRODUCT MANUFACTURING

[75] Inventor: Harriet E. Brichta, Plano, Tex.

[73] Assignee: Electronic Data Systems Corporation, Plano, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 693,840

[22] Filed: Aug. 1, 1996

[51] Int. Cl.[6] .......... G06F 19/00

[52] U.S. Cl. .......... 364/468.16; 702/84; 702/180

[58] Field of Search .......... 364/468.16, 468.15, 364/468.17, 552, 554, 550, 551.01; 395/207, 211; 702/81–84, 179–181, 187; 705/7, 11

[56] References Cited

U.S. PATENT DOCUMENTS

| | | | |
|---|---|---|---|
| 4,665,390 | 5/1987 | Kern et al. | 364/554 X |
| 4,855,930 | 8/1989 | Chao et al. | 364/554 X |
| 5,257,206 | 10/1993 | Hanson | 364/149 X |
| 5,262,961 | 11/1993 | Farone | 364/500 |
| 5,392,226 | 2/1995 | Hamilton | 364/551.01 |
| 5,440,478 | 8/1995 | Fisher et al. | 364/468.16 |
| 5,442,562 | 8/1995 | Hopkins et al. | 364/468.15 |
| 5,586,041 | 12/1996 | Mangrulkar | 364/468.17 X |

OTHER PUBLICATIONS

Laboratory Automation & Information Management, vol. 31, No. 2, Dec. 1995, pp. 141–148 by Paul et al. entitled "Control Charting Instrumental Analyses".

4th International Sampe Electronics Conference, Albuquerque, US, vol. 4, 12–14 Jun. 1990, Covina, CA, USA, Soc. Adv. Mater & Process Eng, US, pp. 589–599 by Lawson et al. entitled "Monitoring Attribute Data for Low–Defect Products and Processes".

IBM Journal of Research and Development, vol. 31, No. 2, Mar. 1987, pp. 199–205 by Yashchin, E. entitled "Some Aspects of the Theory of Statistical Control Schemes".

*Primary Examiner*—Joseph Ruggiero
*Attorney, Agent, or Firm*—David G. Wille; L. Joy Griebenow

[57] ABSTRACT

A system (10) is provided for monitoring services or products. The system (10) includes an interface (12, 18) which can receive criteria information (14) specifying an unacceptable level for services or products. The interface (12, 18) can also receive services or products information (20) relating to the services or products. A database (16), which is coupled to the interface (12, 18), stores the criteria information (14). A processor (22, 27) is coupled to the database (16) and the interface (12, 18). The processor (22, 27) can identify non-random patterns in a predefined danger zone in order to determine when the services or products are approaching the unacceptable level specified in the criteria information (14), thereby monitoring the services or products.

20 Claims, 5 Drawing Sheets

FIG. 4A

80

| REPORT PROCESSING UNIT 418 4/25/96 | | | | |
|---|---|---|---|---|
| 82 | 84 | 86 | 88 | 89 |
| CLASS (BY CUSTOMER) | TOTAL OCCURRENCES | TOTAL IN DANGER ZONE | EXPECTED IN DANGER ZONE | $(f_o-f_e)^2/f_e$ |
| CUSTOMER A | 343,654 | 30 | 38.4 | 1.8 |
| CUSTOMER B | 20,978 | 20 | 2.3 | 133.3 |
| CUSTOMER C | 350,492 | 0 | 39.1 | 39.1 |
| CUSTOMER D | 450,503 | 80 | 50.2 | 17.6 |
| TOTAL | 1,165,627 | 130 | 130.0 | 191.8 |

FIG. 4B

90

| REPORT PROCESSING UNIT 418 FROM: 4/25/96 TO: 5/1/96 | | | |
|---|---|---|---|
| CUSTOMER D | | | |
| 92 | 94 | 96 | 98 |
| DATE | TOTAL IN DANGER ZONE | EXPECTED IN DANGER ZONE | $(f_o-f_e)$ |
| 4/25/95 | 80 | 50.2 | 29.8 |
| 4/26/96 | 82 | 50.2 | 31.8 |
| 4/27/96 | 89 | 50.2 | 38.8 |
| 4/28/96 | 93 | 50.2 | 42.8 |
| 4/29/96 | 90 | 50.2 | 39.8 |
| 4/30/96 | 95 | 52.5 | 42.5 |
| 5/1/96 | 100 | 52.5 | 47.5 |

MONITORING OF SERVICE DELIVERY OR PRODUCT MANUFACTURING

TECHNICAL FIELD OF THE INVENTION

This invention relates generally to the field of monitoring systems, and more particularly to the monitoring of service delivery or product manufacturing.

BACKGROUND OF THE INVENTION

In the modern world, almost every business entity is a provider of either products or services, or both. Typically, the products or services must meet one or more criteria which are established by the provider or its customers who purchase such products or services. For example, a customer which purchases information processing services may require that ninety-five percent of the customer's trivial, interactive transactions be processed within one second after a provider has received information for the transactions.

In order to ensure that a provider is meeting these criteria, the provider must monitor the manufacture, distribution, performance, or delivery of the products or services. Previous systems and methods for monitoring were capable of alerting a provider that products or services had failed to meet the appropriate criteria after the failure had occurred. Unfortunately, these systems and methods provided no mechanism to warn a provider before such failures occurred so that the provider could prevent or reduce the impact of the failures. Furthermore, the prior systems and methods did not identify the cause of the failures.

SUMMARY OF THE INVENTION

In accordance with the present invention, the disadvantages and problems associated with the monitoring of product manufacturing or service delivery have been substantially reduced or eliminated.

In accordance with one embodiment of the present invention, a system is provided for monitoring services or products. The system includes an interface which can receive criteria information specifying an unacceptable level for services or products. The interface can also receive services or products information relating to the services or products. A database, which is coupled to the interface, stores the criteria information. A processor is coupled to the database and the interface. The processor can identify non-random patterns in a predefined danger zone in order to determine when the services or products are approaching the unacceptable level specified in the criteria information, thereby monitoring the services or products.

In accordance with another embodiment of the present invention, a method is provided for identifying when services or products are approaching unacceptable levels. The method includes receiving criteria information specifying an unacceptable level for services or products. A danger zone is defined. Services or products information relating to the services or products is also received. Non-random patterns in the defined danger zone are identified in order to determine when the services or products are approaching the unacceptable level specified in the criteria information.

An important technical advantage of the present invention includes alerting a provider of services or products when the services or products are approaching unacceptable levels relative to predetermined criteria. This is accomplished by collecting information specifying the criteria established by the provider or its customers for the products and services. These criteria may relate to, for example, processing time, response time, percentage of transaction or items processed, or any other suitable criterion for a product or service. As the provider manufactures, distributes, performs, delivers or otherwise provides the services or products, information relating to each occurrence of manufacture, distribution, performance, or delivery is collected and processed to generate descriptive statistical information, including, for example, a mean, a standard deviation, a sample size, an upper control limit, and a lower control limit, for the various criteria. For each criterion, the statistical information may further specify whether the products or services manufactured, distributed, performed, delivered or otherwise provided are approaching unacceptable levels. Consequently, the provider can take appropriate action if necessary to prevent or substantially minimize the impact should the products or services exceed the unacceptable levels.

Another important technical advantage of the present invention includes the use of a statistical calculation, such as a chi-square ($X^2$) calculation, to identify non-random patterns in a specific range of a distribution corresponding to occurrences of manufactured, distributed, performed, or delivered products or services. More specifically, a danger zone, such as 1.5 standard deviations above a mean, can be identified or defined using historical descriptive statistics, such statistics based on, for example, a two month rolling average of the mean and standard deviation. Further, the occurrences can be separated into classes, each class corresponding to a discrete entity, such as, for example, a customer, a production machine, or a facility. For each class, an expected number of occurrences within the danger zone is calculated based upon the representation of that class in the total distribution. As data is collected for actual occurrences, the number of actual occurrences for the class is compared to the number of expected occurrences for that class. If the actual number of occurrences differs substantially from the expected number of occurrences, then action can be taken accordingly.

Yet another important technical advantage of the present invention includes the maintenance and use of historical data relating to the representation of occurrences in the danger zone. This historical data can be used to evaluate changes in performance over time, to project future performance outcomes, and to direct corrective actions. Specifically, in one embodiment, exception data can be stored over time for customers receiving services having significantly greater than expected representation in the danger zone. Trends of representation in the danger zone can be examined to evaluate consistency, severity, and proximity to control limits for problems. Priorities for responding to the problems can be established accordingly.

Other important technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description taken in conjunction with the accompanying drawings, in which:

FIGS. 4A and 4B illustrate exemplary report tables generated by the system shown in FIG. 1;

DETAILED DESCRIPTION OF THE INVENTION

Figure 1:
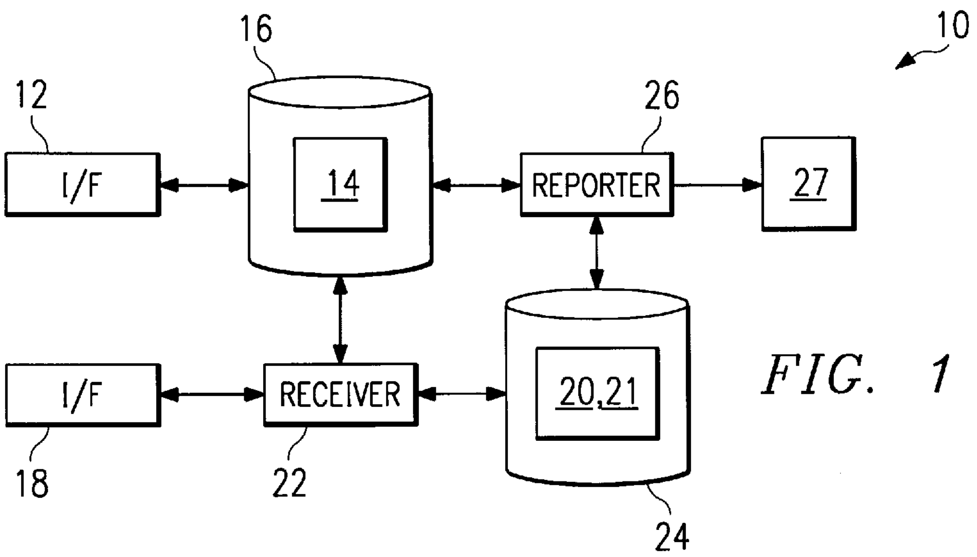
FIG. 1 illustrates a system for monitoring products or services, according to an embodiment of the present invention.

The preferred embodiment of the present invention and its advantages are best understood by referring to FIGS. 1 through 7 of the drawings, like numerals used for like and corresponding parts of the various drawings.

According to the present invention, a danger zone is defined for a heterogeneous distribution of a criterion for a service or product, and then observed occurrences in the danger zone are examined for non-random patterns that would warn of approaching unacceptable levels for that criterion. Because random occurrences in the danger zone are to be expected, a statistical calculation, such as a chi-square ($X^2$) or binomial calculation, can be employed to evaluate the statistical significance of observed patterns. In particular, statistical calculation may be used to distinguish between random and non-random patterns in the defined danger zone. In other embodiments, however, non-statistical methods may be utilized to identify non-random patterns.

The heterogeneous distribution comprises a sample population of occurrences. Each occurrence corresponds to a specific instance in which a product or a service is manufactured, distributed, performed, delivered, or otherwise provided. The occurrences may be characterized by one or more characteristics. For example, in an environment in which occurrences correspond to products, characteristics for an occurrence can be length, width, height, or weight of a product. Similarly, in an environment in which occurrences correspond to services, exemplary characteristics may include turnaround time, response time, or successful completion of a service request. Each occurrence in the sample population may have an associated value for each characteristic. For example, one occurrence of a product may have values of 4.98 inches, 2.61 inches, and 1.92 inches for a length, a width, and a height characteristic, respectively. Another occurrence of a product may have values of 4.83 inches, 2.68 inches, and 1.89 inches for the length, width, and height characteristics, respectively. For each characteristic, the values of the sample population of occurrences may be distributed about a statistical mean. An exemplary distribution of occurrences is illustrated and described below in more detail with reference to FIGS. 3A and 3B.

Generally, each predetermined criterion specifies a quality or control limit for the value associated with a characteristic of an occurrence. For example, in a product environment, a criterion may specify that the minimum and maximum acceptable values for a width characteristic of the product are 2.69 and 2.71 inches, respectively. Similarly, in a service environment, a criterion may specify that the maximum value for a response time characteristic is one second.

The occurrences of services or products are heterogeneous in the sense that they may be separated into various classes, where each class corresponds to a distinct entity belonging to a group of similar entities. By way of example, in a product environment, a class may correspond to a particular production machine which is only one of several similar production machines on a manufacturing line. Each occurrence within the class may correspond to a particular product output by the production machine. In a service environment, for example, where the same resource is used to provide services to multiple customers, a class may correspond to a particular customer. Each occurrence within the class, for example, corresponds to a specific performance or delivery of service to that customer. In other embodiments, however, the distribution of occurrences is not required to be heterogeneous.

Generally, the chi-square statistic is a test of the significance of occurrences in a range of distribution. More specifically, the chi-square statistic is a measure of association which can be used to determine whether there is a non-random pattern in a specific range of distribution of occurrences for a particular characteristic. The formula for $X^2$ is as follows:

$$X^2 = \Sigma \left[ \frac{(f_0 - f_e)^2}{f_e} \right]$$

where $f_e$ is the expected frequency of occurrences, $f_o$ is the actual frequency of occurrences, and the summation is over the number of classes characterizing a given problem. The chi-square statistic can be utilized to determine if the actual frequencies correspond to expected frequencies. An expected frequency in a specific range is equal to the proportion of the class in the total sample times the total number of occurrences in the range. The chi-square statistical calculation is based upon the premise that the proportion of occurrences for a particular class in any particular range of distribution should be substantially the same as the proportion of occurrences for that class in the total population.

For example, in a product environment, a number of products of the same type may have different values for a length characteristic. One product may have a length of 2.2 inches, another may have a length of 2.3 inches, yet another may have a length of 2.15 inches, and so on. These products may be manufactured on one of four machines: machine A, machine B, machine C, or machine D. For purposes of chi-square statistical calculation, classes in such an environment may be defined by machine. That is, class A, class B, class C, and class D correspond to machines A through D, respectively. Each occurrence may correspond to a particular product output by one of machines A through D. If one hundred products are output by machine A, four hundred products are output by machine B, two hundred products are output by machine C, and three hundred products are output by machine D, then a total population of one thousand occurrences may comprise one hundred occurrences in class A, four hundred occurrences in class B, two hundred occurrences in class C, and three hundred occurrences in class D. Occurrences may be distributed about a statistical mean according to the length characteristic. If one hundred occurrences appear in a given range of distribution relative to the mean, then the chi-square statistical calculation suggests that of these one hundred occurrences, ten occurrences should be class A, forty occurrences should be class B, twenty occurrences should be class C, and thirty occurrences should be class D. If for a particular class the actual number of occurrences in the given range of distribution substantially differs from the expected number, then the distribution is non-random.

If an unusually high number of occurrences for a particular class appear in a range of distribution proximate a control value (as specified by a criterion), then services or products in that class are approaching unacceptable levels. With regard to the present invention, if the occurrences associated with a particular class in a danger zone is not substantially the same as the number that would be indicated by the chi-square statistical calculation, then problems may exist for the products or services.

The following describes primarily how the present invention identifies non-random patterns in the delivery of services in an information processing environment so that a service provider may be alerted when services are approaching unacceptable levels. However, it should be understood that the present invention is not limited to such an exemplary embodiment. In alternative embodiments, the present invention could be used to identify non-random patterns in any other environment in which products or services are manufactured, distributed, delivered, performed, or otherwise provided, so that the provider is alerted when products or services are approaching unacceptable levels. Thus, it should be understood that in the following, whenever an object or entity is described or modified by the word "service," the same object or entity may alternatively be described or modified by the word "product." Stated differently, the present invention can be utilized in both service and product environments, and thus should not be limited by the descriptive terms used in the following exemplary embodiment.

FIG. 1 illustrates a system 10 for monitoring services or products. In particular, system 10 can be used to monitor services delivered in an information processing environment (not shown). The information processing environment may comprise one or more components of processing equipment, such as banks of processors running suitable software, which are used by a service provider to provide processing services to one or more customers. Each component of processing equipment may be dedicated to serving one or more customers, or multiple components of equipment can be dedicated to serving a single customer. The components of processing equipment can be used to process batch jobs, interactive transactions, or any other type of suitable processing load submitted by a customer. Generally, batch jobs comprise a large number of discrete items to be processed at the same time. For example, a batch job may entail the processing of a batch of cash letters at a bank for a particular business day. Interactive transactions typically relate to a single transaction which should be processed immediately, such as a request to withdraw money at an automated teller machine.

System 10 includes a first interface (I/F) 12 which can be accessed by one or more users for inputting, retrieving, and presenting information. The functionality of first interface 12 can be performed by one or more suitable input devices, such as a keypad, touch screen, or other suitable device that can accept information, and one or more suitable output devices, such as a computer display, for conveying information associated with the operation of system 10, including digital data, visual information, or audio information. First interface 12 functions to receive criteria information 14.

Generally, criteria information 14 includes information relating to the various criteria that should be met in the manufacture, distribution, performance, delivery or provision of services or products. In an information processing environment, the criteria may specify control values for various characteristics associated with information processing services, such as response time, turnaround time, percentage of transactions processed, or any other suitable characteristic. For example, if the customer is a bank which maintains an automated teller machine, criteria information 14 may specify that interactive transactions occurring at the automated teller machine should be processed within a second. Different control values for the same characteristic may be associated with various levels of service, in which case the control values may specify unacceptable levels of service. In one embodiment, the level of service provided to any customer may be either in accordance with a service level standard (SLS) or a service level agreement (SLA). The service level standard defines a general level of service which is typically afforded to customers. A service level agreement, which can be tailored to suit the needs of a particular customer, defines any level of service that differs from the service level standard. Criteria information 14 may be customer specific. Thus, for each customer of the service provider, criteria information 14 may specify the name or identity of the customer, the types of services requested by the customer, and a level of service promised to the customer according to each type. In one embodiment, a user may input at least a portion of criteria information 14 into system 10, via interface 12, by examining the contractual agreement between the service provider and the customer.

A criteria memory 16 may be coupled to first interface 12. Criteria memory 16 may reside in a suitable storage medium, such as random access memory (RAM), read-only memory (ROM), disk, tape storage, or other suitable volatile or non-volatile data storage system. Criteria memory 16, which may be a relational database, retrieves, receives, stores, and forwards criteria information 14.

A second interface (I/F) 18 may receive services information 20. Like first interface 12, the functionality of second interface 18 may be performed by one or more suitable input devices, such as a keypad, touch screen, or other suitable device that can accept information, and one or more suitable output devices, such as a computer display, for conveying information associated with the operation of system 10, including digital data, visual information, or audio information. In one embodiment, second interface 18 may be the same interface as first interface 12.

Generally, services information 20 includes detailed information relating to the services actually delivered or performed by a provider. It should be understood, however, that in a product environment, this information would relate to the products actually manufactured, distributed, delivered, or otherwise provided. For an information processing environment, services information 20 comprises information relating to each occurrence of processing services actually performed or delivered to the customers of the service provider. An occurrence, for example, can be the processing of a particular batch job or automated teller machine transaction. For each occurrence, such detailed information may specify the identity of the customer for which services are performed, the type of service, the time and date on which processing services are requested, the component of processing equipment utilized, the workload in which processing occurs, the amount of processing time, the time and date at which processing is completed, and any other suitable details for the occurrence of services delivered or performed.

In one embodiment, services information 20 may be automatically input into system 10 as the services are delivered to or performed for the customers. In particular, appropriate software running on each component of processing equipment monitors or tracks the services. As the processing equipment processes various workloads for the customers, the software collects or generates services information 20 for input into second interface 18.

A receiver 22 is coupled to second interface 18 and criteria memory 16. The functionality of receiver 22 may be performed by a processor, such as a main-frame, file server, work station, or other suitable data processor running appropriate software. Receiver 22 functions to receive and process services information 20 input into system 10 via second interface 18. For example, receiver 22 is operable to perform statistical process control (SPC) on the services information 20. Statistical process control can be customer-specific. Under statistical process control, receiver 22 calculates or generates descriptive statistical information 21 in response to services information 20. Statistical information 21 relates to the distribution for occurrences of services according to various characteristics, such as response time or turnaround time. For each characteristic, statistical information 21 may specify a statistical mean for the population of occurrences, a standard deviation from the statistical mean, an upper control limit defined as a predetermined number of standard deviations above the mean, a lower control limit defined as a predetermined number of standard deviations below the mean, a danger zone for occurrences, the total number of occurrences in the population, the number of occurrences in the danger zone, and other statistical information as desired. The statistical information 21 may be derived using services information 20 from a predetermined prior period as a sample population or base. This predetermined period may comprise the previous thirty days, the previous sixty days, or any other suitable period of time. The rolling sample basis provides a stable, accurate estimate for the distribution of occurrences according to the characteristics. Rolling averages can be calculated utilizing the daily descriptive statistics.

The calculated upper control limit and lower control limit define an "in control" or stable range for occurrences. If occurrences appear outside the stable range, the delivery of processing services is considered to be unstable or "out of control." During or after the performance of statistical process control, receiver 22 is operable to determine whether each occurrence of a service falls within the stable range. If all occurrences do not fall within the stable range, receiver 22 is operable to prompt a user of system 10 to contact an operator of the information processing environment so that the processing environment can be stabilized, as explained below in more detail.

Receiver 22 may also identify occurrences which fall within the danger zone. The danger zone can be defined as a region that is at least a predetermined number of standard deviations away from the statistical mean, but still within the stable region. In one embodiment, the danger zone can be customer-specific—i.e., a separate danger zone is defined for each customer. If an occurrence falls within the danger zone, receiver 22 functions to store details for the occurrence in a suitable memory, such as a services memory 24. By maintaining information for occurrences in the danger zone, system 10 is able to identify non-random patterns in the services delivered or performed. In particular, if a disproportionate number of occurrences appear in the danger zone, the services may be in danger of failing to meet the criteria specified in criteria information 14.

In one embodiment, detailed services information 20 for occurrences not falling within the defined danger zone is discarded and only descriptive statistical information 21 is maintained for an appropriate period of time. Specifically, system 10 calculates the descriptive statistical information 21 (e.g., mean, standard deviation, and sample size) and then retains only detailed services information 20 for occurrences in the danger zone. For each customer, information specifying a total sample size and number of occurrences in the danger zone may also be maintained. Thus, the amount of memory or data storage required for system 10 is minimized or reduced. In an alternate embodiment, where data storage is not a concern, system 10 maintains or stores all of the services information 20. Statistical information 21 can then be calculated on demand as necessary.

Receiver 22 may also function to link or relate services information 20 and statistical information 21 received or generated at receiver 22 with criteria information 14 stored in criteria memory 16. Because the services information 20 and statistical information 21 can be customer specific, occurrences of services are preferably tied to corresponding customers identified in criteria information 14. The link or relationships may be implemented in the form one or more suitable indices or pointers. Consequently, specific occurrences of services and the related statistical information can be associated with the customer for which the service is performed. If certain occurrences of services are associated with a customer not identified in criteria information 14, receiver 22 may function to prompt a user of system 10 to input suitable criteria information 14, for example, via first interface 12. If criteria information 14 cannot be entered by a user at such time, receiver 22 may be operable to enter one or more defaults which may specify, for example, a standard level of service for the customer.

Services memory 24 may be coupled to receiver 22. Services memory 24 may reside in a suitable storage medium, such as RAM, ROM, disk, tape storage, or other suitable volatile or non-volatile data storage system, which can be the same or separate from the data storage system containing criteria memory 16. Services memory 24 can also be a relational database. Services memory 24 stores the information processed or generated by receiver 22, including services information 20 and statistical information 21. Services memory 24 may also function to store the links, such as pointers or indices, which associate the occurrences specified in services information 20 with particular customers identified in criteria information 14.

A reporter 26 is coupled to criteria memory 16 and services memory 24. The functionality of reporter 26 may be performed by a processor, such as a main-frame, file server, work station, or any other suitable data processor running appropriate software. Reporter 26 functions to generate report information 27 comprising words, tables, graphs, or charts created from the information stored in memories 16 and 24. Exemplary charts and tables are illustrated and described below in more detail with reference to FIGS. 3A, 3B, and 4. Report information 27 can be presented to a user in the form of one or more screens displayed on a computer monitor, print copy, or any other suitable media. Reporter 26 can also generate one or more alerts, such as, for example, an audible signal, that actively alert a user to various conditions in the service environment.

When generating report information 27, reporter 26 may perform a statistical calculation in order to distinguish between random and non-random patterns in the occurrences observed in the danger zone. For example, in one embodiment, reporter 26 may perform a chi-square statistical calculation using at least a portion of criteria information 14, services information 20, or statistical information 21. In particular, for each characteristic, reporter 26 functions to determine an expected number of occurrences for each customer that fall within the danger zone for that characteristic. Classes in this chi-square example calculation correspond to particular customers of the service provider. The chi-square statistical calculation is illustrated and discussed in more detail with reference to FIG. 7. Reporter 26 can also determine whether the actual number of occurrences in the danger zone is significantly greater than or less than the expected number of such occurrences. Reporter 26 may also function to determine whether non-random patterns are statistically important, and thus alert a user of system 10, either actively (e.g., audible signal) or passively (e.g., report graph), if appropriate. In addition, reporter 26 may identify trends in the patterns of occurrences in the danger zone, as explained below.

Report information 27 can be used for a variety of purposes, such as identifying patterns in the distribution of occurrences about a statistical mean. The reports may indicate whether the number of such occurrences falling within the danger zone is rising, declining, or remaining steady over time. Report information 27 can be used to determine whether there is a non-random pattern in the distribution of occurrences of services. The report information 27 may also identify whether specific workloads are in danger of not performing acceptably, the proximity of individual workload performance to an extreme value defined by a criterion, and systematic changes or trends in workload performance.

Figure 2:
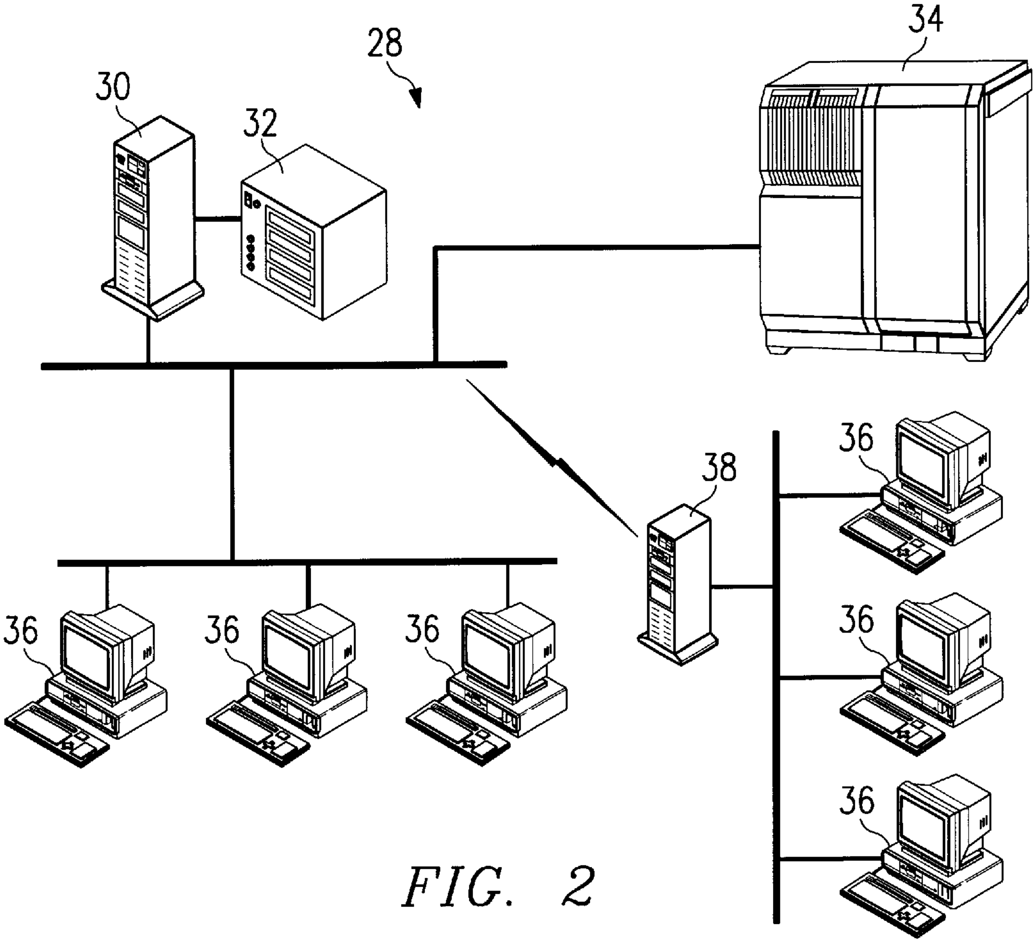
FIG. 2 illustrates an exemplary computer-based system that can be used to implement the monitoring system shown in FIG. 1.

FIG. 2 is a simplified diagram of an exemplary computer-based system 28 than can be used to implement the monitoring system 10 shown in FIG. 1. Referring to the embodiment shown in FIG. 2, computer-based system 28 can include a process server 30, a data storage device 32, a computer 34, a plurality of work stations or desk top computers 36, and a local file server 38.

Process server 30 preferably functions to process criteria information 14, services information 20, statistical information 21, and report information 27 received or generated by system 10. A SUN SOLARIS 2.3 system has been successfully utilized as a process server 30. Data storage device 32 can be a mass storage subsystem of tapes or disk drives, which is electronically coupled to process server 30. In one embodiment, a relational database resides in data storage device 32. Criteria memory 16 and services memory 24, shown in FIG. 1, can be stored in the relational database residing in data storage device 32. Process server 30 may retrieve, process, and store the information in the relational database residing in data storage device 32.

Computer 34 may be linked electronically to process server 30 through a local area network (LAN) or wide area network (WAN), for automated up-loading and down-loading of information therebetween. Any computer, which includes a central processing unit (CPU) and suitable RAM, ROM, and input/output (I/O) circuitry can be utilized for computer 34.

At least one work station 36 can be coupled to process server 30 by the same or a different LAN or WAN connecting computer 34. Preferably, each work station 36 is a desk top computer having at least a "486" processor or an operational equivalent. Work stations 36 may function to receive and display criteria information 14, services information 20, statistical information 21, and report information 27 to a user of system 10. In addition, a work station 36, running appropriate software, may be coupled to each component of processing equipment in an information processing environment so that services information 20 and statistical information 21 can be automatically received or generated by system 10.

Local file server 38 may be linked electronically to process server 30 by the same or a different LAN or WAN, or by telecommunications line through a modem (not specifically shown). Additionally, as shown (for illustrative purposes only) in FIG. 2, process server 30 can be linked by a "gateway" interface communications processor to local file server 38. Local file server 38 is preferably connected to at least a second work station 36, which provides the same functionality as the first work station 36 previously described.

One can use computer-based system 28 to collect, maintain, analyze, or generate criteria information 14, services information 20, statistical information 21, and report information 27 for one or more information processing environments maintained by the provider. Because different processing environments can be situated throughout the world, information associated with any specific information processing environment can be collected at the site of the processing environment via, for example, a work station 36. This information can then be relayed to a centralized location, such as process server 30, data storage device 32, or computer 34, for storage and analysis. Process server 30, computer 34, work stations 36, and local file server 38, either individually or in combination, can perform the functionality of receiver 22 and reporter 26. Furthermore, because these devices are preferably linked together, each can directly access (e.g., store and retrieve) the criteria information 14, services information 20, statistical information 21, and report information 27, if necessary.

Figure 3A:
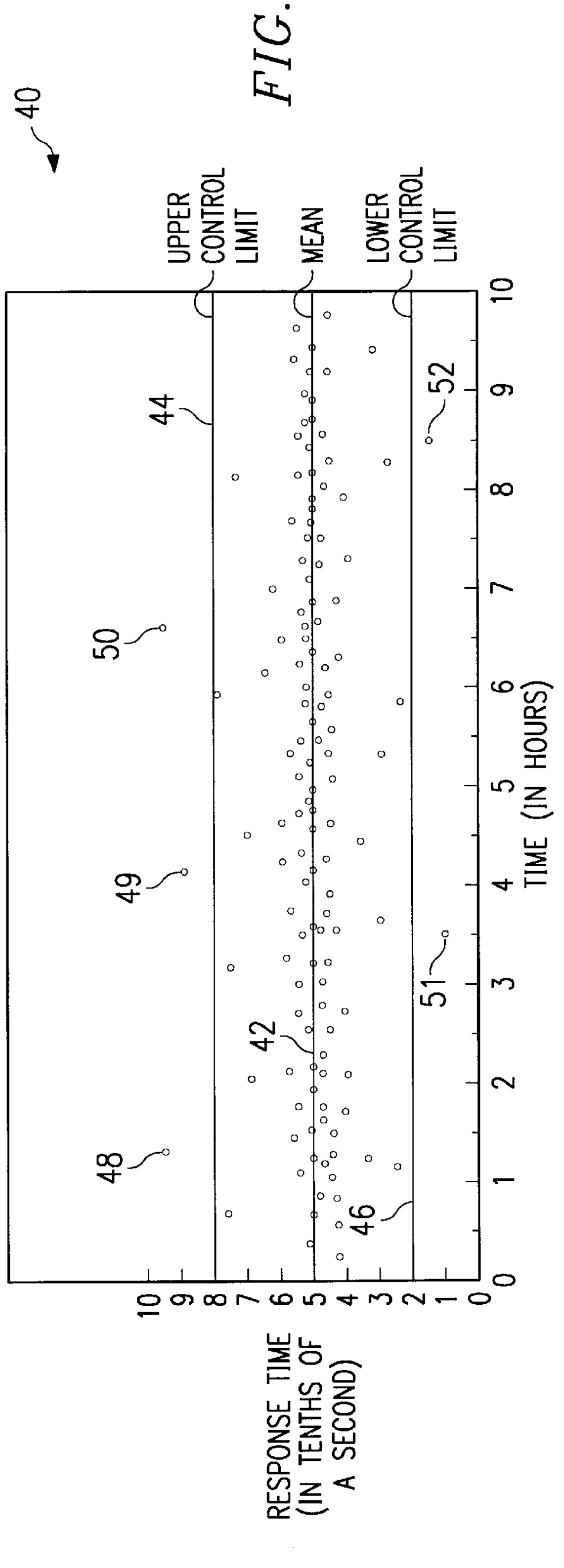
FIGS. 3A and 3B illustrate exemplary control charts generated by the system shown in FIG. 1.
Figure 3B:
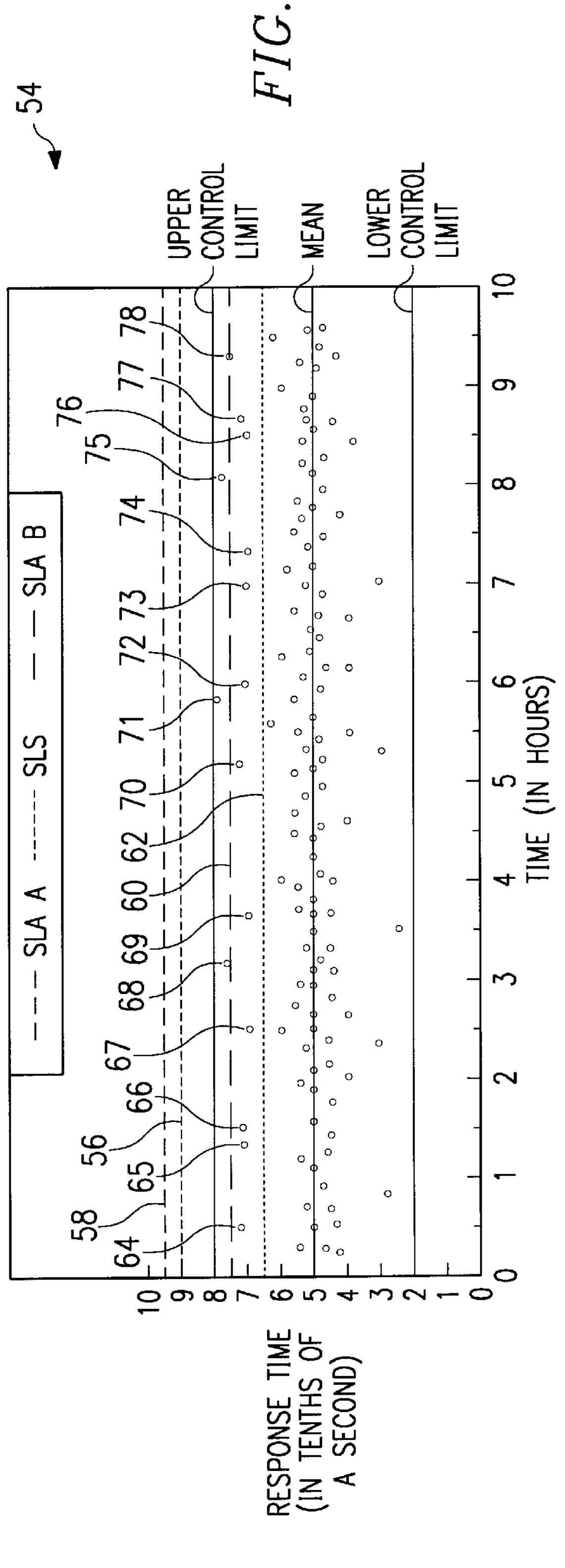

FIGS. 3A and 3B are exemplary control charts which may be generated by system 10 shown in FIG. 1 using information contained in criteria memory 16 and services memory 24. The control charts may be included in report information 27. FIGS. 3A and 3B graphically illustrate the application of statistical process control to information received by system 10. Each of these figures may be associated with a particular characteristic of service delivered or performed, such as response time or turnaround time. More specifically, each of FIGS. 3A and 3B shows a distribution of occurrences about a statistical mean for the particular characteristic over time.

Referring to FIG. 3A, a control chart 40 is illustrated. Control chart 40 comprises a plurality of occurrences of services in an information processing environment. Each occurrence may be associated with one of a plurality of customers. Details for each occurrence can be specified in services information 20 and statistical information 21 received or generated by system 10. Control graph 40 may also include a plurality of demarcation lines 42 through 46 corresponding to various statistical calculations specified by statistical information 21. As stated above, the statistical information 21, including a mean and a standard deviation, may be calculated based on a rolling predefined period, such as the prior thirty days. A mean line 42 corresponds to the calculated mean of the occurrences for the particular characteristic. The mean is shown in graph 40 having a value of "5." An upper control limit line 44, which is shown having a value of three standards deviations above the mean or "8," corresponds to the calculated upper control limit for the characteristic. A lower control limit line 46, which is shown having a value of three standard deviations below the mean or "2," corresponds to the calculated lower control limit. The upper limit and the lower control limit are each specified by criteria information 14.

Upper control limit line 44 and lower control limit line 46 define a stable region comprising a range of three standard deviations above or below the mean specified by mean line 42. In accordance with statistical process control analysis, all occurrences which appear within this region are attributable to "normal" or "common" causes. Any occurrence outside of the stable region is an anomaly or outlier that is most likely attributable to a "special cause," which is usually associated with a problem in the information processing environment. As shown in FIG. 3A, occurrences outside the stable region include occurrences 48 through 52. If occurrences appear in the area outside of the stable region, the processing environment is considered to be "out of control" or "unstable." Statistical predictions generally cannot be made for an out of control processing environment. Thus, in order to analyze the information in control graph 40, special cause occurrences are preferably eliminated so that the processing environment is stabilized.

When a special cause occurrence is detected, system 10 may alert a user to contact an operator of the processing equipment in which the special cause occurrence occurs to obtain an explanation for the occurrence. In many cases, an operator in the information processing environment is most able to identify and resolve problems associated with a special cause occurrence. After the operator has been consulted, appropriate action, such as preventative measures, can be taken to eliminate special cause occurrences, thereby stabilizing the information processing environment.

FIG. 3B illustrates an exemplary control graph 54 in which special cause occurrences have been eliminated so that the information processing environment can be analyzed. Control graph 54, which is similar to control graph 40 shown in FIG. 3A, includes a number of demarcation lines 56 through 60 in addition to those illustrated and described with reference to FIG. 3A. A service level standard (SLS) line 56 defines the standard level of service afforded to customers for the particular characteristic of the control graph. A service level agreement A (SLA A) line 58 defines the level of service provided for the characteristic pursuant to a hypothetical service level agreement A. As shown, this level of service is less stringent (easier to meet) than the service level standard. A service level agreement B (SLA B) line 60 defines a level of service provided pursuant to a hypothetical service level agreement B. As illustrated, this service level is more stringent (harder to meet) than the service level standard, and is even lower than the upper control limit. Information for the standard level of service, the service level agreement A, and the service level agreement B may be included in criteria information 14. Each of SLS line 56, SLA A line 58, and SLA B line 60 may correspond to a control value (defined by a criterion) for the characteristic of control graph 54, as specified in the service level standard, the service level agreement A, and the service level agreement B, respectively. Service level lines 56, 58, and 60 are overlaid on the distribution of occurrences so that a user can readily determine whether the service provider is meeting the criteria for the characteristic.

Control graph 54 also includes a danger line 62. Danger line 62 and upper control limit 44 define a danger zone for the occurrences of services. Occurrences falling within the danger zone, which include occurrences 64 through 78, are proximate to the control values. A non-random pattern comprising a disproportionately large number of occurrences for one customer in the danger zone indicates that service provided to that customer is approaching an unacceptable level.

It should be understood that in a service environment, customers are primarily concerned with only one side of a distribution of occurrences. Stated differently, a customer typically cares only about whether the service provided is at least as good as promised. For example, a customer in an information processing environment may specify that batch jobs should be processed within three hours. The customer does not care how quickly a batch job is processed as long as it is processed within the three hour period. On the other hand, in a product environment, manufacturing tolerances may dictate that occurrences fall between limits defined at two sides of the distribution. For example, a product specification for a lever may require that the width of the lever fall between 3.98 inches and 4.02 inches. Consequently, for a service environment, system 10 typically generates and analyzes information at only one side of the distribution, whereas for a product environment, system 10 generates and analyzes information at both sides of the distribution.

FIG. 4A illustrates an exemplary report table 80 generated by system 10 shown in FIG. 1. Report table 80, which may be included in report information 27, can be specific to a particular component of processing equipment and time period. As shown in FIG. 4, report table 80 comprises report information for the date of Apr. 25, 1996, relating to processing unit number "418." Report table 80 illustrates the supporting detail for a chi-square statistical calculation using services information 20 and statistical information 21. The classes for the chi-square calculation shown correspond to customers.

Report table 80 includes a plurality of columns 82 through 89. A customer column 82 specifies two or more customers, for example, by name or another form of identification, such as an alpha-numeric code. For each customer identified in customer column 82, a total actual column 84 specifies the total number of actual occurrences of services delivered or performed during the reporting period. Columns 86 and 88 relate to the statistical distribution of occurrences according to a characteristic, such as response time or turnaround time. Actual number in danger zone column 86 specifies the actual number of occurrences of services that appear within the danger zone for the reporting period. Expected number in danger zone column 88 specifies the number of occurrences that were expected to appear in the danger zone for the reporting period, based on their representation in the total sample. For each customer, the expected number of occurrences in the danger zone may be calculated from the information specified in columns 84 and 86. In particular, this total expected number of occurrences for each customer may be derived from the total number of occurrences for the customer, the total number of occurrences for all customers, and the total number of occurrences in the danger zone. Chi-square statistic column 89 specifies the chi-square statistic for each customer.

FIG. 4B illustrates an exemplary report table 90 which can be generated by system 10 shown in FIG. 1. Like report table 80 shown in FIG. 4A, report table 90 can be included in report information 27. Report table 90 can be specific to a particular component of processing equipment, time period, and customer. As illustrated, report table 90 comprises information relating to services performed on processing unit 418 for Customer D for the period between Apr. 25, 1996, and May 1, 1996.

Report table 90 includes a plurality of columns 92–98. Date column 92 specifies dates on which services were performed or delivered to Customer D. Total in danger zone column 94 and expected in danger zone column 96 specify the actual and expected number of occurrences, respectively, for each date. Deviation column 98 specifies the deviation between the actual and expected occurrences.

Exemplary control graphs 40 and 54 shown in FIGS. 3A and 3B and report table 80 shown in FIG. 4, individually or in combination with similar report tables, graphs, or other reports, outline report information 27 which can be used to determine whether services delivered to or performed for one or more customers are approaching unacceptable levels. The report information 27 identifies various trends over time, such as the increase or decrease of occurrences in the danger zone, rate of change for the distribution of occurrences, proximity of occurrences to the service level standard or service level agreement lines and the like. For example, control charts 40 and 54 reveal patterns in the danger zone, such as the number and concentration of special cause occurrences and occurrences in the danger zone. Likewise, report table 90 reveals trends in the deviation between actual and expected occurrences in the danger zone over time. By observing trends over time, the consistency, severity, and trend of service delivery or performance for each customer can be evaluated so that corrective actions can be taken. Report information 27 provides a sense of urgency so that various actions can be taken accordingly, such as investigating the source of the cause, reorganizing work schedules, prioritizing workloads, scheduling of runtime improvement (RTI) efforts, contacting a particular client, or renegotiating a customer contract.

For example, report table 80 and control graphs 40 and 54 may be used to identify that a first processing unit is barely able to process all its workloads as scheduled while a second processing unit is only being utilized up to half of its capacity. Consequently, workloads can be moved from the first processing unit to the second processing unit before the first unit fails to meet its schedule.

Figure 5:
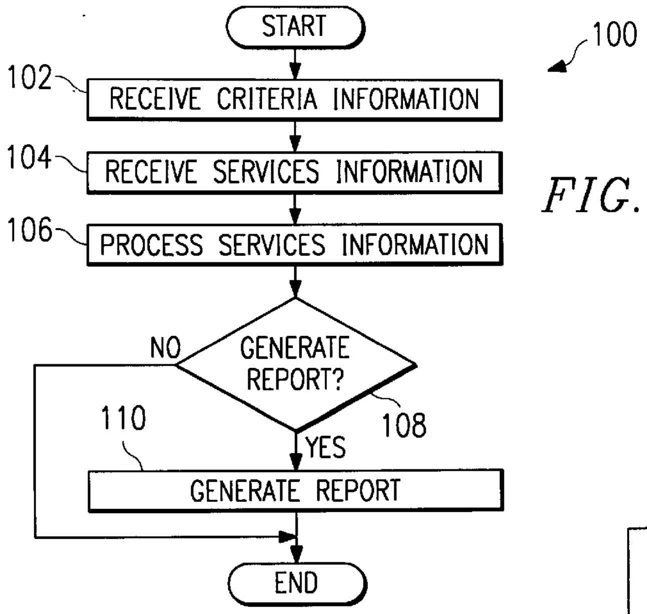
FIG. 5 is a flow chart of a method for monitoring products or services, according to an embodiment of the present invention.

FIG. 5 is a flow chart of a method 100 for monitoring services for products, according to an embodiment of the present invention. More specifically, method 100 may be used to monitor services delivered or performed in an information processing environment, according to an embodiment of the present invention. Method 100 begins at step 102 where system 10, via interface 12, receives criteria information 14. In one embodiment, system 10 prompts a user to input criteria information 14 as specified in any contracts between the service provider and various customers. For each customer, criteria information 14 may specify the name or identity of the customer, the types of services to be provided to the customer, the level of service to be afforded to the customer for each type, time and date of contractual agreement, term of contractual agreement and any other suitable information. The criteria information 14 can be stored in criteria memory 16.

System 10 via second interface 18 receives services information 20 at step 104. In one embodiment, software running on appropriate hardware connected to the processing environment automatically inputs the services information 20 into system 10. For each occurrence of services, the services information 20 may identify the occurrence and specify the time and date of the occurrence, a customer associated with the occurrence, processing time for the occurrence, and any other suitable information. This information is forwarded to receiver 22.

At step 106, receiver 22 processes services information 20, as described below in more detail with reference to FIG. 6. As part of the processing, receiver 22 may generate statistical information 21.

System 10 then queries a user whether a report should be generated at step 108. If a report should be generated, reporter 26 generates report information 27 at step 110. Using report information 27, system 10 may output reports according to various parameters, such as time period, component of processing equipment, customer, characteristic of delivered services, or any other suitable parameter, in any of a variety of formats, such as a table, graph, chart, or any other suitable format for conveying information. In one embodiment, the parameters and format for any particular analysis report can be defined by the user of system 10 as desired to view specific report information 27.

Alternatively, system 10 may automatically output report information 27 based on current and historical statistical information, thereby alerting a user to important events. In one embodiment, system 10 may send an e-mail message to an operation or site manager.

Figure 6:
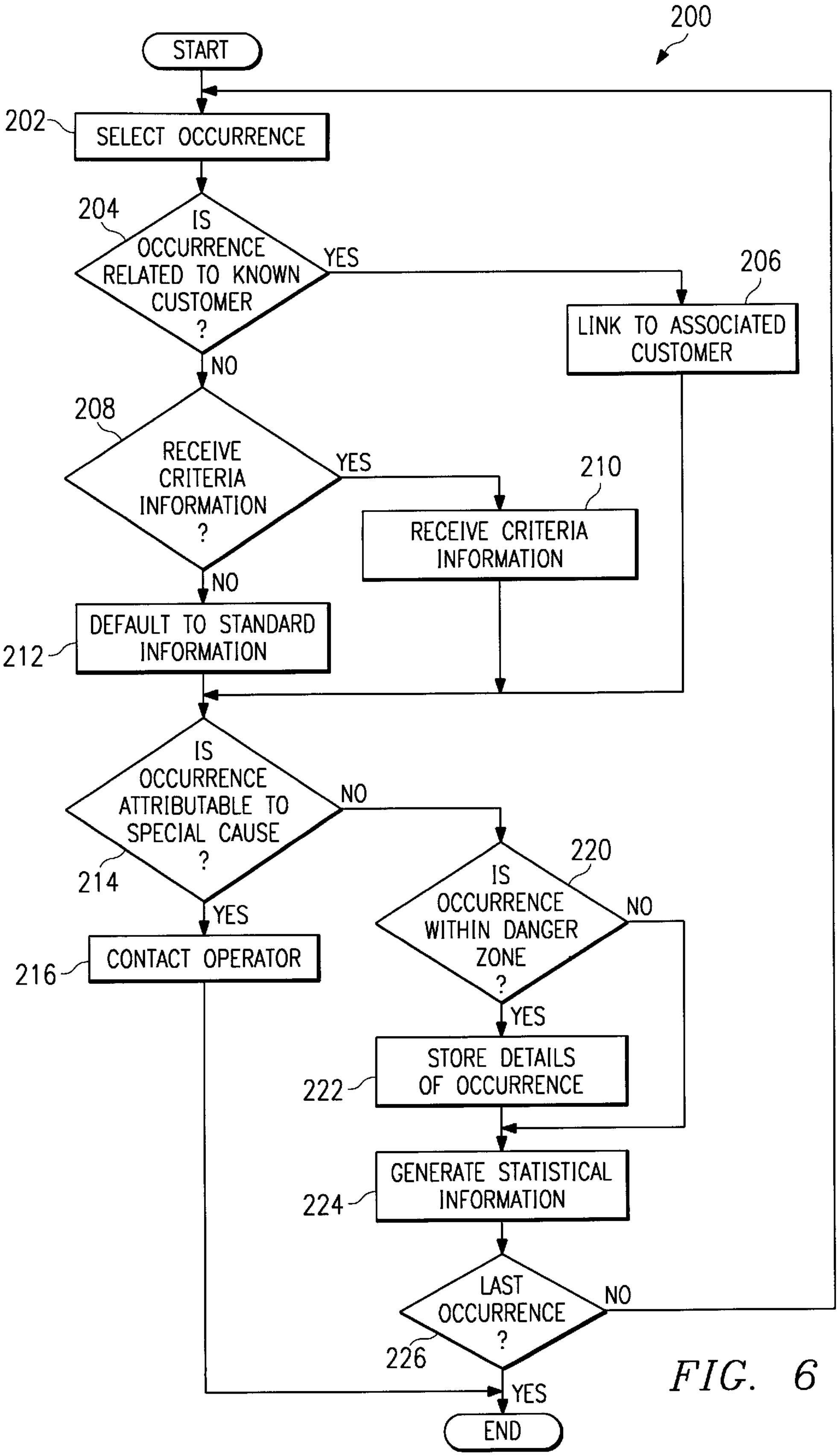
FIG. 6 is an exemplary flow chart of a method for processing information relating to occurrences of products or services manufactured, distributed, or performed, delivered, or otherwise provided.

FIG. 6 is an exemplary flow chart of a method 200 by which receiver 22 processes information, such as services information 20, relating to occurrences of products or services manufactured, distributed, performed, or delivered. Method 200 may correspond to step 106 shown in FIG. 5. Method 200 begins at step 202 where receiver 22 selects an occurrence of services.

Receiver 22 determines whether the occurrence is related to a "known" customer at step 204. A known customer is one for which criteria information 14 is stored in criteria memory 16. If the occurrence is related to a known customer, receiver 22 links the occurrence to the associated customer at step 206, for example, by generating a pointer or index.

If the occurrence is not related to a known customer, then at step 208, receiver 22 queries whether criteria information 14 for the customer should be received. If criteria information is to be received, receiver 22 may direct a user to input the information into system 10 via first interface 12 at step 210. Otherwise, at step 212, receiver 22 may default to standard information for the customer, such as a default level of service, until criteria information 14 for the customer can be received.

Receiver 22 then determines whether the occurrence is attributable to a special cause at step 214. If so, system 10 directs a user to contact or consult the operator of the processing equipment on which the occurrence occurred at step 216. Operators usually have the most knowledge of problems causing such occurrences and how to resolve them. After the operator or other appropriate person has been consulted, appropriate action can be taken to stabilize the information processing environment so that analysis can be performed.

If the occurrence is not attributable to special cause, then at step 220, receiver 22 determines whether the occurrence falls within the danger zone, as previously defined, If so, receiver 22 stores the details of the occurrence in memory 24 at step 222. This information relating to occurrences within the danger zone can be analyzed by reporter 26 to identify non-random patterns.

At step 224, receiver 22 generates statistical information 21 for one or more characteristics of the occurrences, such as turnaround time, response time or any other suitable characteristic.

At step 226, receiver 22 queries whether the occurrence is the last occurrence which is to be considered. If not, system 10 returns to step 202 where receiver 22 selects another occurrence. System 10 repeats steps 202 through 226 until each occurrence of the services information 20 has been processed.

In various embodiments, all or only a portion of the detailed services information 20 and descriptive statistical information 21 may be stored or maintained by system 10 depending on the storage concerns for the system.

Figure 7:
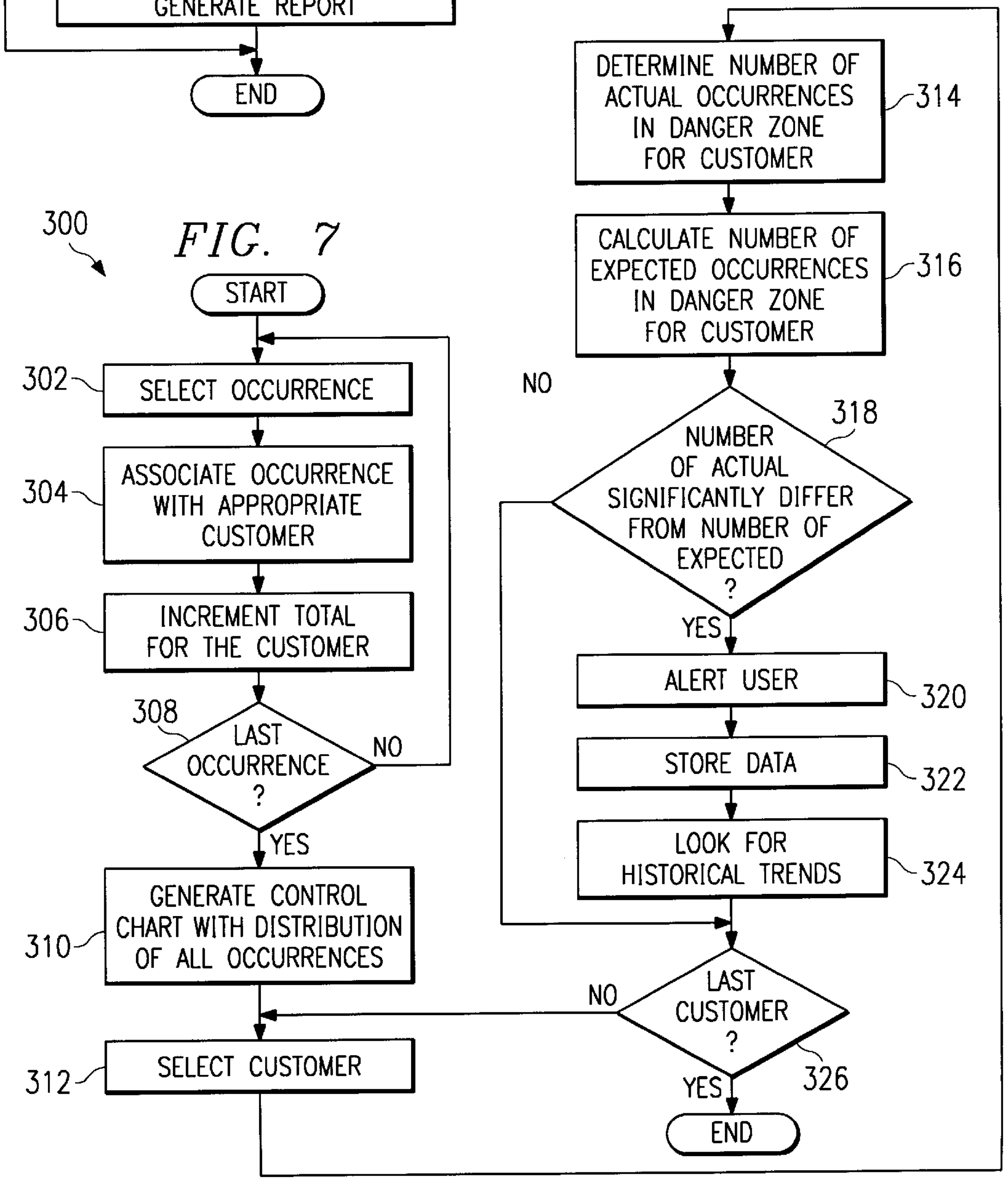
FIG. 7 is an exemplary flow chart of a method for identifying non-random patterns in a distribution of occurrences.

FIG. 7 is an exemplary flow chart of a method 300 for identifying non-random patterns in a distribution of occurrences of products or services manufactured, distributed, performed, delivered, or otherwise provided. In particular, method 300 can be used to identify non-random patterns in an information processing environment. Method 300 begins at step 302 where system 10 selects an occurrence identified in services information 20. System 10 associates the occurrence with an appropriate customer at step 304. At step 306, system 10 increments a total for the number of occurrences associated with the customer.

At step 308, system 10 determines whether the occurrence is the last occurrence identified in the services information 20. If not, system 10 returns to step 302 where the next occurrence is selected. System 10 repeats steps 302 through 308 until each occurrence in the services information 20 is associated with an appropriate customer and a total number of occurrences for each customer is generated.

At step 310, system 10 generates a control chart, such as exemplary control charts 40 and 54 illustrated in FIGS. 3A and 3B, respectively. The control charts can be used in analyzing and identifying patterns in the distribution of occurrences according to various characteristics.

Reporter 26 of system 10 selects a customer at step 312. Reporter 26 then determines the number of actual occurrences in a danger zone for the selected customer at step 314. At step 316, reporter 26 calculates the number of expected occurrences in the danger zone for the customer as the proportion of occurrences in the total sample times the number of total occurrences in the danger zone.

Reporter 26 determines whether the number of actual occurrences in the danger zone significantly differs from the number of expected occurrences in the danger zone at step 318. It should be understood that a single or even a few occurrences in the danger zone do not necessarily indicate a non-random pattern. For example, a piece of processing equipment may be acting extremely on a single day. However, if the difference between the actual number and the expected number of occurrences in the danger zone is significant, the distribution of occurrences may be non-random, thus indicating that action should be taken in order to prevent the services performed for or delivered to that customer from exceeding the criteria for the customer. Consequently, system 10 alerts a user at step 320.

At step 322, system 10 stores the information relating to the expected and actual number of occurrences for the customer. In one embodiment, system 10 may retain the descriptive statistical information for the entire sample, totals of occurrences by customer, and the detailed services information for occurrences in the danger zone. At step 324, system 10 then looks for historical trends in the information, such as, for example, the historical trending of deviations between the actual and expected number of occurrences.

At step 326, system 10 queries whether the customer is the last customer. If not, system 10 returns to step 312 where another customer is selected.

System 10 repeats steps 312 through 326 until it has identified any non-random patterns in the distribution for each customer and also any trends. In this manner, system 10 is able to warn or alert a user when services to a customer are in danger of exceeding the criteria specified for the customer.

Although the present invention and its advantages have been described in detail, it should be understood that various changes, substitutions, and alterations can be made therein without departing from the spirit and scope of the invention as defined by the appended claims.

What is claimed is:

1. A system for monitoring services or products comprising:

an interface operable to receive criteria information specifying an unacceptable level for services or products, the unacceptable level associated with one boundary of a stable region for a characteristic of the services and products, the interface further operable to receive services or products information relating to the services or products;

a database coupled to the interface and operable to store the criteria information; and a processor coupled to the database and the interface, the processor operable to identify non-random patterns in a danger zone distant from a statistical mean for the characteristic of the services or products and contained within the stable region proximate the boundary associated with the unacceptable level, thereby determining when the services or products are in danger of exceeding the unacceptable level.

2. The system of claim 1, wherein the processor is further operable to generate statistical information from the services or products information.

3. The system of claim 1, wherein the processor is further operable to generate information specifying a mean, a standard deviation, an upper control limit, and a lower control limit for the characteristic of the services or products.

4. The system of claim 1, wherein the processor is further operable to alert a user when the services or products are in danger of exceeding the unacceptable level.

5. The system of claim 1, wherein:

the services or products information comprises information specifying an actual number of occurrences of services or products within the danger zone; and the processor is further operable to determine an expected number of occurrences in the danger zone, the processor further operable to compare the expected number of occurrences against the actual number of occurrences in the danger zone.

6. The system of claim 1, wherein the processor is further operable to identify occurrences of services or products attributable to a special cause.

7. The system of claim 1, wherein the processor is operable to determine whether non-random patterns are statistically significant.

8. The system of claim 1, wherein the processor is further operable to examine trends in non-random patterns in the danger zone over time.

9. A system for monitoring services or products comprising:

an interface operable to receive criteria information specifying a control value for defining a danger zone for a characteristic of services or products, the danger zone distant from a statistical mean for the characteristic and within a stable region having a boundary associated with an unacceptable level for the characteristic, the interface further operable to receive services or products information, the services or products information specifying actual values for a plurality of occurrences of services or products according to the characteristic;

a database coupled to the interface and operable to store the criteria information; and a processor coupled to the database and the interface, the processor operable to determine whether a statistical non-random pattern exists in a distribution of the values for the occurrences within the danger zone, thereby determining when the services or products are in danger of exceeding the unacceptable level.

10. The system of claim 9, wherein the processor is operable to perform a chi-square statistical calculation.

11. The system of claim 9, wherein the processor is further operable to generate information specifying a mean, an upper control limit, and a lower control limit for the characteristic of services or products.

12. The system of claim 9, wherein the processor is further operable to alert a user when the services or products are in danger of exceeding the unacceptable level.

13. A method for monitoring services or products, comprising the steps of:

receiving criteria information specifying an unacceptable level for services or products, the unacceptable level associated with one boundary of a stable region for a characteristic of the services or products;

defining a danger zone distant from a statistical mean for the characteristic of the services or products and contained within the stable region proximate the boundary associated with the unacceptable level;

receiving services or products information relating to the services or products; and identifying non-random patterns in the defined danger zone in order to determine when the services or products are in danger of exceeding the unacceptable level.

14. The method of claim 13, further comprising the step of generating statistical information from the services or products information.

15. The method of claim 13, further comprising the step of generating information specifying a mean, an upper control limit, and a lower control limit for the characteristic of the services or products.

16. The method of claim 13, further comprising the step of determining whether at least one occurrence specified in the services or products information is attributable to a special cause.

17. The method of claim 13, further comprising the step of contacting an operator if at least one occurrence is attributable to a special cause.

18. The method of claim 13, wherein the step of identifying non-random patterns in the defined danger zone further comprises the step of performing a statistical calculation using the received services or products information.

19. The method of claim 13, wherein the step of identifying non-random patterns in the defined danger zone further comprises the step of performing a chi-square statistical calculation.

20. The method of claim 13, further comprising the step of alerting a user when the services or products are in danger of exceeding the unacceptable level.

* * * * *